United States Patent Office 3,547,704
Patented Dec. 15, 1970

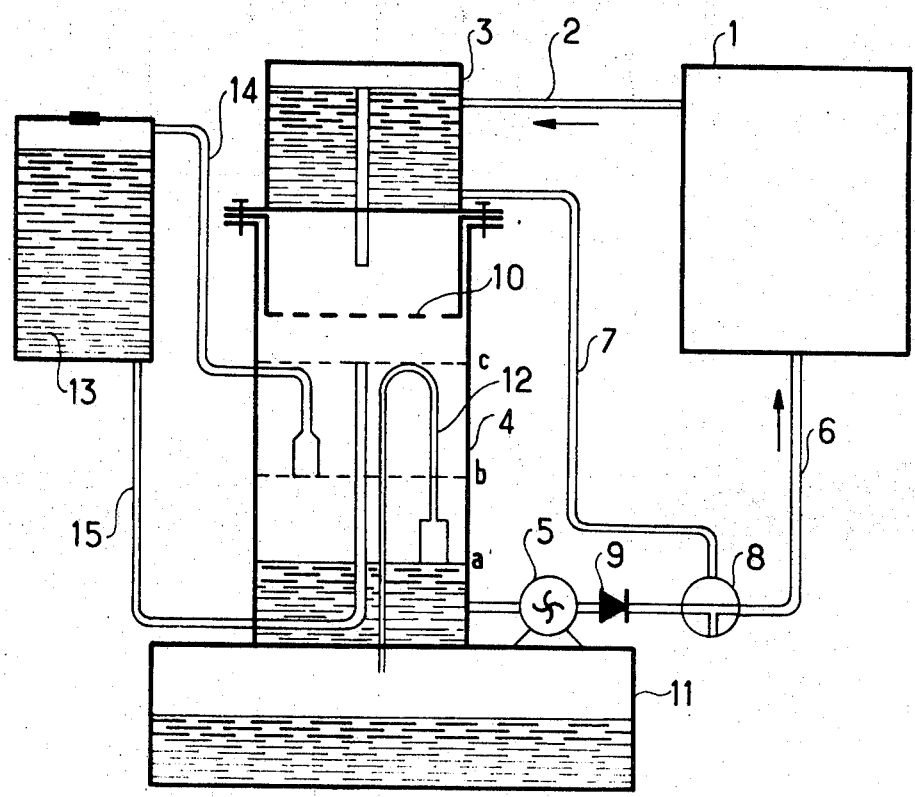

3,547,704
AUTOMATIC MEANS FOR REGULATING THE CONCENTRATION OF ELECTROLYTE OF A FUEL CELL
Jean-Paul Pompon, Vitry, Seine, France, assignor to Compagnie Generale d'Electricite, Paris, France, a corporation of France
Filed Feb. 15, 1968, Ser. No. 705,694
Claims priority, application France, Feb. 17, 1967, 95,509
Int. Cl. H01m *31/00;* F16l *43/00*
U.S. Cl. 136—161                                  6 Claims

ABSTRACT OF THE DISCLOSURE

Automatic regulation of electrolyte concentration within a fuel cell by siphoning various strength portions to and from a gauge chamber in response to change in chamber level.

---

This invention relates to an automatic system for regulating the concentration of electrolyte in a fuel cell capable of functioning normally when the concentration of electrolyte is between a higher value $C_1$ and a lower value $C_2$.

In fuel cells of the hydrogen-oxygen type, the electrolyte is diluted during operation by formation of water which results from the electrochemical process. It is necessary for the cell to function satisfactorily that the concentration of electrolyte be maintained above a certain minimum value, the value being determined by the characteristics of the cell. Thus, it is necessary to reconcentrate the electrolyte during the operation of the cell, for example, by drawing off diluted electrolyte and adding concentrated electrolyte. This operation can be achieved manually but the manual process requires the presence of an operator that is subject to certain inaccuracies. It is also possible to employ automatic means, such as electromagnetic valves to control concentration with the electrical energy to the valve being supplied by the self-produced current of the cell. This control scheme has certain disadvantages including consumption of the energy produced by the cell as well as a lack of reliability.

It is therefore an object of this invention to provide an automatic regulation system for maintaining the electrolyte concentration within a fuel cell within desirable limits which does not employ the electrical energy produced by the cell and which is highly reliable.

It is a further object of this invention to provide an automatic system of regulation of the electrolyte concentration in a fuel cell which recirculates the electrolyte normally when the concentration of the electrolyte is between the values $C_1$ and $C_2$ with the value $C_1$ being higher than $C_2$. The present system is further characterized in that the excess diluted electrolyte, due to the formation of water during the functioning of the cell, is introduced into a calibration chamber with the self-regulating means operating automatically when the level of liquid within the chamber reaches any one of three levels. The system includes withdraw means in the form of a siphon which is primed when the quantity of liquid in the chamber reaches the highest of the three levels and is unprimed when the quantity reaches the lowest of the three levels. The system is further characterized by means for supplying electrolye at a concentration $C_3$, higher than the concentration $C_1$ with the means delivering the electrolyte of concentration $C_3$ when the quantity of liquid in the chamber is below the intermediate or mean level. The third two levels are determined in the following manner:

the upper level is reached when the concentration of the electrolyte in the cell is equal to $C_2$,
the mean level is reached when the concentration of the electrolyte in the cell is equal to $C_1$,
the difference in volume between the lower level and the mean level is such that the addition of an equivalent quantity of electrolyte at the concentration $C_3$ into the electrolyte of the cell at the concentration $C_2$ brings it substantially to the concentration $C_1$.

Means are advantageously provided for assuring the circulation of the electrolyte between the calibration chamber and the electrolytic compartment of the fuel cell.

According to one embodiment, the means for supplying concentrated electrolyte comprises a closed reservoir filled with electrolyte and provided in its upper part, with a first conduit opening into the calibration chamber at the mean level, and a second conduit also opening into the calibration chamber at a lower level.

The diameter of the end of the conduit opening at the mean level is advantageously large in relation to the mean diameter of the conduit.

The second conduit includes a constriction so that the rate of flow in this conduit is much smaller than that of the suction means operating upon the same.

Other features of the invention will become apparent from the following description and the accompanying drawing, in which the single figure shows diagrammatically the present automatic regulation system for regulating the electrolytic concentration within an associated fuel cell.

Referring to the drawing, the electrolytic compartment of the fuel cell is indicated at 1. While the cell is functioning, continuous movement of the electrolyte is assured within the electrolytic compartment through the electrolytic circuit, which comprises: a discharge conduit 2 for discharging electrolyte from the fuel cell 1 into an overflow reservoir. The main object of the overflow reservoir 3 is to ensure filtration of the electrolyte; the overflow from the reservoir 3 flowing into a calibration chamber 4 which forms a principal element of the automatic means for regulating the electrolyte concentration. The electrolyte contained within calibration chamber 4 is pumped by means of pump 5 into the electrolytic compartment 1 through inlet conduit 6. The reservoir 3 can be fluid connected to inlet conduit 6 by by-pass conduit 7 by means of the three-way cock or control valve 8 which is positioned downstream of pump 5 within conduit 6. A one-way or non-return valve 9 is positioned intermediate of pump 5 and the three-way valve 8.

A filter 10 is positioned between the reservoir 3 and the calibration chamber 4. In this manner, the electrolyte which flows through the overflow pipe of reservoir 3 passes through filter 10 and is therefore filtered prior to passing into the electrolytic compartment of the cell. An emptying or discharge reservoir 11 is fluid tight to chamber 4 through siphon 12. A fluid-tight supply reservoir 13 contains concentrated electrolyte, the concentrated electrolyte being discharged from reservoir 13 into the calibration chamber 4 through a conduit 15 which is coupled to reservoir 13 at the bottom thereof. This reservoir 13 is further provided, at its upper part, with a conduit 14 opening up into chamber 4, the opening of conduit 15 being above the opening of conduit 14 within chamber 4, and defining the upper level $c$ of the calibration chamber, while the opening of conduit 14 within this chamber defining the intermediate or mean level $b$. Conduits 14 and 15 therefore define the conditions under which the concentrated electrolyte automatically flows into the calibration chamber 4.

The chamber 4 is thus calibrated at three levels, the lower level $a$, the mean level $b$ and the upper level $c$, the positions of which are hereinafter described in detail.

In the initial state, the electrolyte with a concentration $C_1$ fills the electrolytic compartment 1, the reservoir 3 to the level defined by the overflow pipe and the calibration chamber 4 up to the mean level $b$. According to the present invention, the siphon 12 is such that it is automatically primed when the liquid level in the chamber 4 reaches the upper level $c$ in which case, the electrolyte within the calibration chamber 4 is discharged into the lower reservoir 11. Further, the siphon 12 is unprimed when the liquid level reaches the lower level $a$. In addition, conduit 14 opens at the mean level $b$ such that concentrated electrolyte contained in the reservoir 13 only flows through the conduit 15, overflowing into chamber 4 when the liquid level in the calibration chamber is below the mean level $b$.

During the functioning of the cell 1 with the pump 5 operating, a continuous movement of electrolyte is set up between compartment 1, the overflow reservoir 3 and the calibration chamber 4. If no water has been formed in the electrolyte, the liquid level in chamber 4 would remain at the initial mean level $b$. However, as water is formed, which causes an increase in volume of the electrolyte, the level in chamber 4 is raised proportionately with the formation of water and after a certain time lapse reaches the upper level $c$ within the calibration chamber 4. At this moment, there is formed in the electrolyte a quantity of water equal to the volume of chamber 4 contained between the mean level $b$ and the upper level $c$. The upper calibration level $c$ is so chosen that, when the liquid level in the chamber 4 reaches it, the concentration of the electrolyte in the cell is equal to the value $C_2$ which is obviously lower than the value $C_1$, the value $C_2$ forming the lower limiting value of the electrolytic concentration corresponding to the functioning of the cell with the efficiency for which it was initially set.

When the liquid reaches the upper level $c$ within the calibration chamber, the siphon 12 is automatically primed and discharges the liquid contained in the chamber 4 into the lower reservoir 11. Siphoning continues until the liquid level within the calibration chamber 4 reaches the lower level $a$ whereupon, the siphon 12 is unprimed and siphoning ceases. When the liquid level in the chamber 4, in moving from $c$ to $a$, reaches the mean level $b$, air is able to enter the reservoir 13 since the bottom opening of conduit 14 is exposed and as a result, the concentrated electrolyte contained in the reservoir 13 now flows into the chamber 4 through conduit 15. In accordance with the present invention, the conduit 15 includes a constriction (not shown) so that the rate of flow of the conduit is much smaller than the rate of flow of the siphon 12. A very small quantity of concentrated electrolyte from reservoir 13 therefore enters the calibration chamber 4 through conduit 15 during the time in which the liquid level of the calibration chamber 4 moves from the mean level $b$ to the lower level $a$. For this purpose, the point at which the conduit 15 discharges into calibration chamber 4 is positioned at the maximum distance from the orifice of the siphon 12.

As the electrolyte in the reservoir 13 is at the concentration $C_3$ which is higher than concentration $C_1$, the lower level $a$ of the calibration chamber 4 is determined in the following manner:

The difference in volume between the lower level $a$ and the mean level $b$ is such that the addition of an equivalent quantity of electrolyte at the concentration $C_3$ into the electrolyte of the cell at concentration $C_2$ brings it substantially to the desired concentration $C_1$.

Consequenly, when the liquid level in the chamber 4 reaches the level $b$ after the addition of concentrated electrolyte at concentration $C_3$ from reservoir 13, the concentration of the electrolyte in the electrolytic circuit and thus in the electrolytic compartment 1 of the cell has subsantially the initial value $C_1$. At this point, the supply of concentrated electrolyte is stopped automatically due to the fact that conduit 14 opens up into chamber 4 at this level and thus, as the electrolyte rises from level $b$ to level $c$ within chamber 4, the opening is progressively filled with liquid, this having the effect of automatically stopping flow through conduit 15. The diameter of the end of conduit 14 which opens up into chamber 4 at level $b$ is advantageously large in relation to the mean diameter of this conduit so that, when the liquid level in the chamber 4 becomes lower than the mean level $b$, the quantity of liquid contained in conduit 14 flows rapidly into chamber 4 to immediately cause the conduit 15 to be brought into operation discharging concentrated electrolyte from reservoir 13. As a non-limiting example of the present invention, one specific apparatus involved a calibration chamber 4 in which the liquid level passes from level $c$ to level $a$ as a result of siphoning action of siphon 12 in approximately 10 to 15 seconds. The filling of the calibration chamber 4 from level $a$ to level $b$ was effected through conduit 15 and a time period of approximately 2 minutes with the liquid level of the calibration chamber moving from level $b$ to level $c$ because of the water produced in the electrolyte during operation of the fuel cell, in about 5 hours.

When the cell is not operating, the pump itself is stopped and the non-return valve 9 has the effect of preventing the electrolyte contained in the electrolytic compartment 1 of the fuel cell from flowing into chamber 4 if for instance the level of electrolyte in this chamber is at the lower level. Moreover, when the cell is not operating, conduit 7 may be advantageously fluid coupled through reservoir 3 by means of the three-way cock or valve 8. In this way, the electrolyte level is kept constant in the electrolytic compartment 1, even if a quantity of electrolyte contained in the electrolyic compartment 1 is entrained and carried into reservoir 3 by gas bubbles escaping from the electrodes.

It is obvious that the invention is not in any way limited to the embodiment described and illustrated, which has been given only as an example. In particular, it is possible, without departing from the scope of the present invention, to incorporate modifications in regard to details and to change certain devices or replace certain elements by equivalent means.

What is claimed is:

1. A system for automatically regulating the concentration of electrolyte in a fuel cell between an acceptable high concentration level $C_1$ and an acceptable lower concentration level $C_2$, said system comprising: a calibration chamber having a higher, a lower and a mean calibration level, a first reservoir, a siphon fluid coupling said calibration chamber and said first reservoir ensuring the withdrawing a quantity of liquid from said chamber, into said first reservoir when the level of said liquid reaches said upper calibration level and ceasing withdrawal of said liquid when said liquid reaches said lower calibration level, a second reservoir, closed and filled with electrolyte at a concentration $C_3$ which is higher than the concentration $C_1$, and means for automatically supplying electrolyte from said second reservoir into said calibration chamber when the liquid in said chamber is below the mean level, said means comprising a first conduit fluid coupled to said closed reservoir at the upper end thereof and opening into said calibration chamber at said mean level, and a second conduit fluid coupled to said closed reservoir at the bottom end thereof and opening into said chamber at a level higher than that of said first conduit, said system being such that; the upper calibration chamber level is reached when the concentration of electrolyte in the cell is equal to concentration $C_2$; the mean level of electrolyte in said calibration chamber is reached when the concentration of electrolyte in the cell is equal to concentration $C_1$, and the difference in volume between the lower level and the mean level of said calibration chamber is such that the addition of an equivalent quantity of electrolyte at concentration $C_3$ into the electrolyte of the cell at concenration $C_2$ brings it substantially to concentration level $C_1$.

2. The system as claimed in claim 1 further including means for circulating electrolyte between the calibration chamber and the electrolytic compartment of said fuel cell.

3. The apparatus as claimed in claim 1 wherein the diameter of the end of the conduit discharging at said mean level is large in relation to the mean diameter of said first conduit.

4. The system as claimed in claim 1 further including a constriction carried by said second conduit whereby, the rate of fluid from said second closed reservoir to said chamber, is much less than the rate of flow of said electrolyte from said calibration chamber to said first reservoir.

5. The system as claimed in claim 1 further includes a constant level electrolyte reservoir positioned above said calibration chamber and in fluid communication with the electrolytic compartment of said fuel cell, filter means positioned between said constant level reservoir and said calibration chamber and means allowing liquid surplus flowing from said electrolytic compartment into said constant level reservoir to pass from said constant level reservoir, through said filter, and into said calibration chamber.

6. The system as claimed in claim 1 wherein the end of said siphon within said calibration chamber opens to said chamber at the lower calibration level and has a closed conduit portion within said chamber at the higher calibration level.

References Cited
UNITED STATES PATENTS

| | | | |
|---|---|---|---|
| 2,461,334 | 2/1949 | Major | 137—132 |
| 3,080,442 | 3/1963 | Hobert | 136—86 |

DONALD L. WALTON, Primary Examiner

U.S. Cl. X.R.

136—86; 137—132